United States Patent [19]
Palti

[11] Patent Number: 4,595,020
[45] Date of Patent: Jun. 17, 1986

[54] DISPOSABLE PROBE FOR TEMPERATURE MEASUREMENTS IN HUMANS

[75] Inventor: Yoram Palti, Haifa, Israel

[73] Assignee: Fidelity Medical Services, Inc., Millburn, N.J.

[21] Appl. No.: 556,548

[22] Filed: Nov. 30, 1983

[30] Foreign Application Priority Data

May 6, 1983 [IL] Israel .......................................... 68613

[51] Int. Cl.$^4$ ............................................... A61B 5/00
[52] U.S. Cl. ................................ 128/736; 128/640; 374/179
[58] Field of Search .................... 128/736, 640–641; 374/179, 208, 210

[56] References Cited

U.S. PATENT DOCUMENTS

| 3,464,864 | 9/1969 | Rentz | 374/179 X |
|---|---|---|---|
| 4,090,504 | 5/1978 | Nathan | 128/736 |
| 4,166,451 | 9/1979 | Salera | 128/736 |
| 4,174,631 | 11/1979 | Hammerslag | 374/179 |
| 4,308,870 | 1/1982 | Arkans | 128/736 X |
| 4,327,737 | 5/1982 | Szpur | 128/641 X |
| 4,328,814 | 5/1982 | Arkans | 128/641 X |
| 4,407,295 | 10/1983 | Steuer et al. | 128/736 |

Primary Examiner—Edward M. Coven
Assistant Examiner—Angela D. Sykes
Attorney, Agent, or Firm—Fleit, Jacobson, Cohn & Price

[57] ABSTRACT

There is provided a disposable probe for temperature measurements of humans, adapted to be attached to the skin of the person, comprising thermosensitive means, thermally shielded towards the outside, said thermosensitive means being adapted to be connected by leads to sensitive means for measuring the temperature.

4 Claims, 4 Drawing Figures

DISPOSABLE PROBE FOR TEMPERATURE MEASUREMENTS IN HUMANS

FIELD OF THE INVENTION

There is provided a disposable device for measuring the temperature of a patient. The probe is applied to a suitable location on the human body, remains in place for prolonged periods of time and makes possible repeated determinations of the temperature of the patient.

BACKGROUND OF THE INVENTION

Various attempts have been made to provide disposable devices and means for determining the temperature of the human body. These have not been successful, as they have certain drawbacks as regards accuracy and cost. Various disposable thermometers have been tried, but these were not satisfactory.

SUMMARY OF THE INVENTION

The novel device according to the invention comprises a probe which is applied to the body of a patient at a predetermined location; it is left in place to attain thermal equilibrium and may be connected at any time to a temperature monitor which indicates in a speedy and accurate manner the temperature of the patient.

The probe is based on a thermally insulated thermocouple or similar device which is attached to the skin of the person and left in place. The temperature monitor is a standard battery operated temperature measuring device designed to be operated in conjunction with a suitable thermocouple, thermopile or with similar temperature-sensitive means, said probe being connected to the monitor by suitable leads. There is advantageously provided a monitor with readout memory which provides a prolonged readout of the temperature after a brief connection to the probe. Such temperature monitors (TM) are generally high-resolution DC measuring devices, which have a resolution of the order of 1 to 10 microvolts, as the output of conventional thermocouples is about 30 to 50 microvolts/°C.

They are also equipped with a "cold junction" compensation and leads made of the specific thermocouple materials when operating in conjunction with a thermocouple.

The thermoprobe (TP) comprises essentially a thermocouple shielded to the outside by suitable thermal insulating means, a connector being provided at its surface which can be connected to the monitor leads (TM). The probe is positioned on the skin of the patient so that the thermocouple (or thermopile) is in contact or in close proximity to the skin, at a location with good blood circulation. This may be the base of the shoulder or the base of the neck, or any other suitable location. The thermocouple advantageously is in good contact with the skin, and a thermal conducting paste may be used. The area of the skin and the thermocouple are shielded from the outside by an adequate layer of thermal insulation, such as polyurethane foam, foam rubber or the like.

The diameter of the thermal insulation is advantageously of the order of 2 to 3 cm, and its thickness can vary between about 0.5 and 2 cm. depending on the insulating properties of the foam. There must be provided adequate thermal insulation so that the thermocouple will attain within a reasonable period of time a thermal equilibrium with the temperature of the core of the human body, its temperature reaching that of the interior of the body. The probe is advantageously attached to the skin by suitable adhesive means.

Experiments have shown that after a period of time of about 15 to 30 minutes the probe attains a thermal equilibrium with the body temperature, and from that time on the said probe may be connected by the leads to the monitor whenever a reading of the body temperature is required. There is obtained a nearly instantaneous readout of the temperature, and after this the monitor may be disconnected and used with other patients. The probe can be left in place with hospitalized patients for a number of days, and repeated readings of the body temperature may be obtained. A probe with a small heat conductive (metal) disk behind the tip of the thermocouple gave good results.

The probe is advantageously provided with thin metal wires of the order of 0.1 mm which connect the junction with the surface plug so as to reduce heat losses through such wires. The wires from the thermocouple tip lead via the insulating layer to a plug on the free face of the probe which is connectable with the monitor.

A special plug or connector is provided on the free surface of the insulating material to be used as a contact point for the leads of the TM.

The probe may be applied to the skin of the patient as he is admitted to the hospital, and will be left in place until he has to be washed, or even until discharge. After removal, the probe is discarded and replaced by a new one. The disposable probes, provided with means for attachment to the skin, can be provided with a suitable removable cover which protects the adhesive surface and the sterility of the probe, which is peeled off prior to use.

BRIEF DESCRIPTION OF THE DRAWINGS

The invention is illustrated with reference to the enclosed schematical drawings, which are not according to scale and in which.

DESCRIPTION OF A PREFERRED EMBODIMENT

Figure 1:
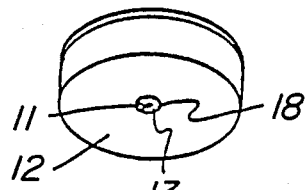
FIG. 1 is a perspective view of a probe, seen from below.
Figure 2:
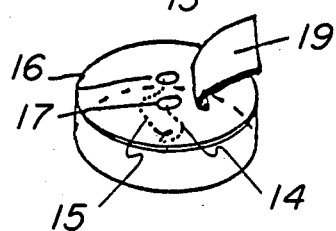
FIG. 2 is a perspective view of a probe, seen from above.

The probe shown in FIGS. 1 and 2 comprises in combination a thermocouple 11, which is located near the lowermost surface of the thermal insulation layer 12, which is a circular member made of foamed polymer (advantageously of closed cell structure to minimize heat losses), provided with a cylindrical selfclosing hole 13 at its center, in which the tip of the thermocouple is located, the wires of the thermocouple, or leads from same, 14 and 15, leading to the electrical contacts 16 and 17.

The electric contacts may be in the form of small metal disks (materials compatible with the thermocouple) or special wire junctions. In both cases the contacts are constructed such as to use a minimum of the relatively expensive materials. The disks are preferably very thin, under 0.1 mm, and of small diameter, about 1 mm.

Any digital meter with reference temperature compensation (when used in conjunction with a thermocouple) and leads which connect it to the probe made out of the same materials as those of the thermocouple can be used. There is optionally provided a thermally conductive plate 18 with a central opening for the tip of the thermocouple 11. There is advantageously provided a contact cover 19 made of thermally insulating material, which minimizes heat losses from the upper surface of the probe. The lowermost surface of the probe is advantageously provided with an adhesive layer, and this may be protected by means of a cover which can be removed prior to use and which is not shown in the drawings. When the probe is to be used, the removable protective cover of the adhesive is removed, and the probe is attached to the skin of the patient so that its lowermost surface is in contact with the skin.

After some 15 to 30 minutes, a thermal equilibrium with body temperature is attained, and from then a suitable device measuring DC voltages in the microvolt range (with cold junction compensation) can be connected as described with the electric contacts 16 and 17. Advantageously, a microvoltmeter with readout memory and with temperature reference means is used. There is obtained an instantaneous measurement of the body temperature, with high accuracy, which can be read at leisure. The monitor can be disconnected, and connected again whenever a further measurement of the temperature is required.

The probes can be manufactured in a manner similar to disposable contact pads used for ECG measurements.

Figure 4:
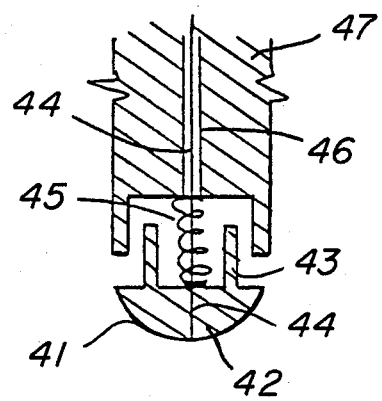
FIG. 4 is an elevational sectional view through a contact member to be attached to the leads of the temperature monitor.
Figure 3:
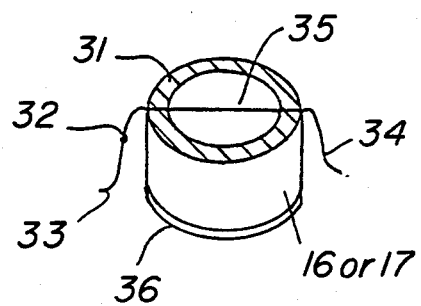
FIG. 3 is a perspective view of an electrical contact member for use on the surface of the probe.

The electrical contacts 16 and 17 may be advantageously used as illustrated with reference to FIGS. 3 and 4. There are advantageously provided at the upper surface of the thermal insulation layer 12, two contacts 16 and 17, each of which consists of a cylindrical member 31, advantageously made of plastic material, of the order of about 3 mm diameter, to which there is glued the wire 32 of the thermocouple, one end of same, 33, being continuous with the said thermocouple, while the other end, 34, is cut free. The part of the wire, 35, which spans the cylinder, is bare and devoid of insulation. As stated above, two such members are provided, one for each of the two wires of the thermocouple. The ends of the leads of the temperature monitor (TM) terminate each in a member as illustrated in FIG. 4, which comprises a curved electrically conducting metal plate 41, made of the thermocouple material according to the contact member 16 or 17, which is to be contacted with same; said metal plate covering the curved member 42 which has an upward extension in the form of a cylindrical member 43.

A thin wire, 44, of the same material as the respective thermocouple wire and contact plate 41, is attached to said contact plate 41, and this passes via weak spring 45 and through a channel 46 at the center of cylindrical member 47 to the temperature monitor. The curved member 42 and curved plate 41 are suspended at a certain distance from the cylindrical member 47 by said spring 45, and this weak spring ensures contact between the contact member 41 and the wire 35 without undue pressure which could tear said wire. The lowermost part of the cylinder 31 is advantageously provided with a thin plate 36. When the temperature is to be measured, the two contacts 16 and 17, each one according to FIG. 3, are contacted with the two lead holders, each of which is according to FIG. 4, and the brief electrical contact suffices for such measurement, after which contact is broken by withdrawal of the lead holders.

Typical values of experimental probes are as follows:
Type of thermocouple used: type T or K (for example),
Size of plastic insulation: diameter from 15 to 30 mm, thickness from 5 to 20 mm;
Size of metal base plate: 4–8 mm diameter, with hole of 0.5–1 mm at its center, 0.05 thickness.
Leads to contacts: 10–30 mm;
Type of microvoltmeter used: Any digital meter with reference temperature compensation (when used in conjunction with a thermocouple) and leads which connect it to the probe made out of the same materials as those of the thermocouple.
Microvolt reading obtained for temperature of patient of 38° C. relative to reference temperature of 20° C.: 400–800 microvolts;
Instead of such thermocouple may be used:
A thermistor, temperature sensitive diode or any other miniature temperature sensitive element. When these are used there is no need for a reference temperature compensation or special materials for the contacts and leads. Instead, a voltage source and, for example, an elementary voltage divider circuit are required.

Disposable probes according to the invention may be produced and marketed attached to a suitable support such as plastic or cardboard card.

The above description is by way of illustration only and changes and modifications may be resorted to without departing from the scope and spirit of the invention.

I claim:

1. A disposable probe for temperature measurement, adapted to be attached to the skin of a person, comprising in combination thermo-sensitive means for measuring temperature, said thermo-sensitive means being shielded by a pad of closed pore foamed polymer or closed pore foamed rubber constituting an effective thermal insulation for the thermo-sensitive means, such that the probe can be used to measure internal body temperature, said thermo-sensitive means being connected by suitable leads to electrical contacts attachable by appropriate leads to sensitive means for measuring temperature, a metal plate with a central hole through which the thermosensitive means protrudes, being provided at a lower surface of said pad, said plate being of a size appreciably smaller than the size of said pad, and an adhesive layer being provided at the lower surface of said pad, for attachment of the probe to the skin.

2. A disposable probe for temperature measurement, adapted to be attached to the skin of a person, comprising in combination thermo-sensitive means for measuring temperature, said thermo-sensitive means being shielded by a pad of closed pore foamed polymer or closed pore foamed rubber constituting an effective thermal insulation for the thermo-sensitive means, such that the probe can be used to measure internal body temperature, said thermo-sensitive means being connected by suitable leads to electrical contacts attachable by appropriate leads to sensitive means for measuring temperature, said electrical contacts being provided at an upper surface of said pad in the form of two contact members, each of which comprises a short tubular member of electrically insulating material and across an upper surface of which there is attached, in a stretched manner, a respective one of two thermocouple wires, the thermocouple wires having ends which can be contacted by leads of the sensitive temperature measuring means when the temperature is to be measured, and an adhesive layer being provided at a lower surface of said pad, for attachment of the probe to the skin.

3. A probe according to claim 2, wherein each tubular member is made of a plastic material.

4. A mechanism for use with a monitor for measuring temperature, comprising a disposable probe adapted to be attached to the skin of a person and including thermo-sensitive means for measuring temperature, said thermo-sensitive means being shielded by a pad of closed pore foamed polymer or closed pore foamed rubber constituting an effective thermal insulation for the thermo-sensitive means, such that the probe can be used to measure internal body temperature, and said thermo-sensitive means being connected by suitable leads to electrical contacts of said probe, an adhesive layer being provided at a lower surface of said pad, for attachment of the probe to the skin, and at least one contact member to be attached to the end of a lead of said monitor, such contact member comprising an elongated member provided with a channel through which there passes a wire of the lead, said wire being attached to a curved contact member of electrically conductive material engageable with one of the electrical contacts of said disposable probe, there being provided a spring which is located between a lower part of the elongated member and an upper part of a support member provided at a lower surface thereof with the curved contact member.

* * * * *